(12) United States Patent
Stichowski et al.

(10) Patent No.: US 9,493,079 B2
(45) Date of Patent: Nov. 15, 2016

(54) METHOD AND DEVICE FOR CHARGING AN ENERGY STORE OF A VEHICLE

(75) Inventors: Torsten Stichowski, Magdeburg (DE); Bernhard Ott, Cremlingen (DE); Michael Keller, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 247 days.

(21) Appl. No.: 14/342,180

(22) PCT Filed: Aug. 28, 2012

(86) PCT No.: PCT/EP2012/003603
§ 371 (c)(1),
(2), (4) Date: Feb. 28, 2014

(87) PCT Pub. No.: WO2013/029774
PCT Pub. Date: Mar. 7, 2013

(65) Prior Publication Data
US 2014/0225567 A1 Aug. 14, 2014

(30) Foreign Application Priority Data
Aug. 31, 2011 (DE) .......................... 10 2011 111 993

(51) Int. Cl.
*B60L 11/18* (2006.01)
*B60L 3/00* (2006.01)
*H02J 7/00* (2006.01)

(52) U.S. Cl.
CPC ............ *B60L 11/1809* (2013.01); *B60L 3/003* (2013.01); *B60L 11/1816* (2013.01); *H02J 7/007* (2013.01); *B60L 2200/26* (2013.01); *B60L 2240/525* (2013.01); *B60L 2240/527* (2013.01); *B60L 2240/529* (2013.01); *B60L 2240/547* (2013.01); *B60L 2240/549* (2013.01);

(Continued)

(58) Field of Classification Search
CPC .................................................... B60L 11/1809
USPC .......................................................... 320/109
See application file for complete search history.

(56) References Cited

U.S. PATENT DOCUMENTS

| | | | | |
|---|---|---|---|---|
| 5,648,714 | A | * | 7/1997 | Eryou .................. H02J 7/0093 320/139 |
| 5,656,920 | A | | 8/1997 | Cherng et al. |
| 7,411,371 | B2 | * | 8/2008 | Hobbs .................. B60L 3/0046 320/128 |

(Continued)

FOREIGN PATENT DOCUMENTS

| | | |
|---|---|---|
| CA | 2648972 A1 | 6/2009 |
| DE | 3528476 A1 | 2/1987 |

(Continued)

OTHER PUBLICATIONS

Search Report for German Patent Application No. 10 2011 111 993.4; Jul. 24, 2012.

(Continued)

*Primary Examiner* — Edward Tso
*Assistant Examiner* — Jerry D Robbins
(74) *Attorney, Agent, or Firm* — Barnes & Thornburg LLP

(57) ABSTRACT

When an energy store of a vehicle is charged via a charging device, a voltage (U) which is made available by the charging device, at a terminal of the vehicle, is measured. A charging current (I) which is made available by the charging device and which charges the energy store is regulated as a function of this voltage (U) in order to limit the power loss during charging.

10 Claims, 2 Drawing Sheets

(52) U.S. Cl.
CPC ........ *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 7,595,607 B2* | 9/2009 | Lambert | H02J 7/0036 320/106 |
| 8,525,470 B2* | 9/2013 | Gale | H02J 7/0072 307/149 |
| 8,575,899 B2* | 11/2013 | Whiting | H01M 10/44 320/149 |
| 2004/0169489 A1* | 9/2004 | Hobbs | B60L 3/0046 320/104 |
| 2008/0007202 A1 | 1/2008 | Pryor | |
| 2010/0318250 A1 | 12/2010 | Mitsutani | |
| 2011/0163716 A1 | 7/2011 | Gale et al. | |
| 2012/0169240 A1* | 7/2012 | Macfarlane | H02M 1/4225 315/152 |

FOREIGN PATENT DOCUMENTS

| | | |
|---|---|---|
| DE | 19521962 A1 | 1/1996 |
| DE | 60111142 T2 | 5/2006 |
| DE | 102005011081 A1 | 9/2006 |
| DE | 102011001472 A1 | 9/2011 |
| EP | 2309617 A1 | 4/2011 |

OTHER PUBLICATIONS

Search Report for International Patent Application No. PCT/EP2012/003603; Mar. 21, 2013.

* cited by examiner

METHOD AND DEVICE FOR CHARGING AN ENERGY STORE OF A VEHICLE

PRIORITY CLAIM

This patent application is a U.S. National Phase of International Patent Application No. PCT/EP2012/003603, filed Aug. 28, 2012, which claims priority to German Patent Application No. 10 2011 111 993.4, filed Aug. 31, 2011, the disclosures of which are incorporated herein by reference in their entirety.

SUMMARY

The present disclosure relates to a method and to a device to charge an energy store of a vehicle by means of an externally supplied voltage.

A vehicle which comprises a device according to the illustrative embodiments or a further device according to the illustrative embodiments is also provided within the scope of the present disclosure.

The disclosed embodiments make it possible to actively monitor the AC voltage across the connection of the vehicle during the charging process, so that the charging process can be immediately terminated, for example, in the case of an excessive voltage dip.

The disclosed embodiments make it possible to actively monitor the power loss during charging, so that, for example, an excessively high power loss is avoided.

The present disclosure provides active protection against overheating of connection plugs or the infrastructure by the power loss being correspondingly limited.

The present disclosure can also be used directly in the vehicle to test vehicle components and vehicle plugs by the voltage profile being monitored during the charging process and an excessively high voltage dip being diagnosed as a defective vehicle component or defective vehicle plug.

The present disclosure is suitable, in particular, for electric vehicles or hybrid vehicles for secure and dynamic charging of a high-voltage energy store. It goes without saying that this invention is not restricted to this field of application since the present invention can also be used, for example, in ships, aircraft and rail-bound or track-guided vehicles. Furthermore, the present disclosure is also suitable, at least in principle, for charging an energy store which is located in a stationary device.

BRIEF DESCRIPTION OF THE DRAWINGS

Illustrative embodiments are described in detail in the text which follows using disclosed embodiments with reference to the figures.

DETAILED DESCRIPTION OF THE DISCLOSED EMBODIMENTS

Figure 1:
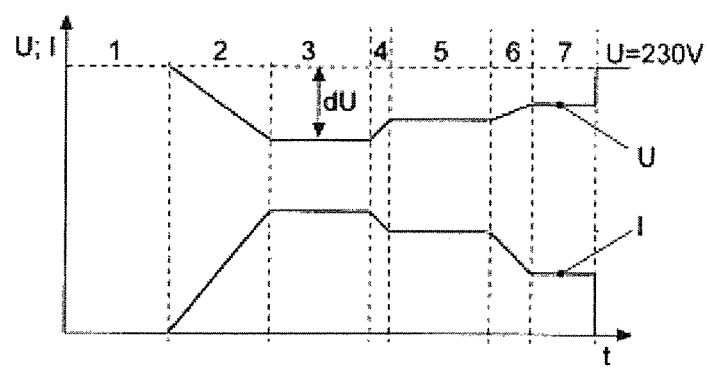
FIGS. 1 and 2 each represent, in line with at least one disclosed embodiment, a voltage profile and a current profile during charging of an energy store.

FIG. 1 depicts a current profile I and a voltage profile U with respect to time t during charging of an energy store. At the beginning of the charging process during the time interval 1, a line by means of which the energy store is electrically charged is not under load, and therefore an open-circuit voltage of 230 V is measured across a corresponding connection of the vehicle, while the charging current is 0 A. The measured value of the open-circuit voltage is stored in the vehicle. The charging current I is increased to a maximum value in the second time interval 2, this leading to the voltage U which is measured across the connection correspondingly dropping. In the third time interval 3, the charging current is kept constant, so that the voltage U which is measured across the connection also remains constant. In the fourth time interval 4, the charging current I is reduced, as a result of which the voltage U which is measured across the connection increases again. During the fifth time interval 5, the power loss is calculated on the basis of the voltage U which is measured across the connection and on the basis of the set charging current I, and evaluated. To lower the power loss, the charging current I is further reduced during the sixth time interval 6, as a result of which the voltage U which is measured across the connection is increased but, nevertheless, the power loss is reduced. Similarly to in the fifth time interval 5, the power loss is calculated on the basis of the voltage U which is measured across the connection and on the basis of the charging current I, and evaluated, during the seventh time interval 7. Since the power loss in this exemplary charging process is considered to be too great, the charging current I is switched off at the end of the seventh time interval 7, as a result of which an open-circuit voltage of 230 V is again produced.

Figure 2:
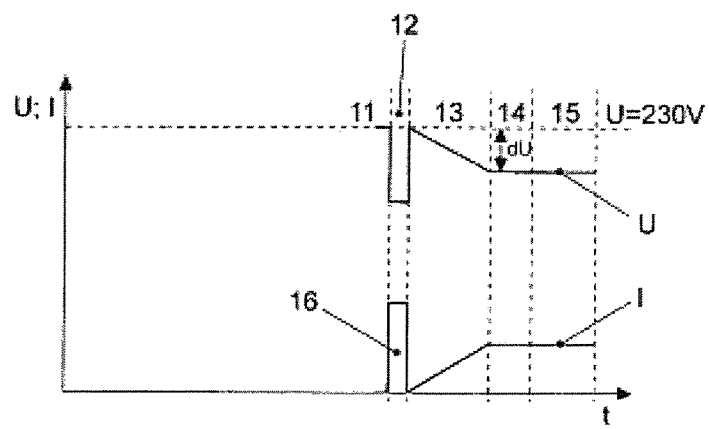

FIG. 2 likewise depicts a current profile I and a voltage profile U with respect to time t during charging in line with a further variant. Similarly to in the variant which is illustrated in FIG. 1, the line is not under load at the beginning of the charging process during the time interval 11, and therefore the open-circuit voltage 230 V is applied to the connection of the vehicle, and can be measured when there is no charging current. A charging current pulse 16, which produces a corresponding pulse-like voltage dip, is generated in the following time interval 12. A line resistance can be determined on the basis of properties of the pulse-like voltage dip together with properties of the charging current pulse 16, wherein then the power loss can be set to an optimum value or the charging current can be set to a maximum possible value with the aid of the line resistance. In this case, the line resistance comprises a resistance of the alternating current line of the charging current and also contact resistances of plugs and coupling points. In the following time interval 13, the charging current I is increased to this calculated maximum value, as a result of which the voltage U which is measured across the connection is correspondingly lowered. The voltage difference dU by which the open-circuit voltage drops in the process corresponds virtually to exactly 3%. In the following time interval 14, the charging current I is kept at this value, so that the voltage U also remains constant. The charging process is continued in time interval 15.

Figure 3:
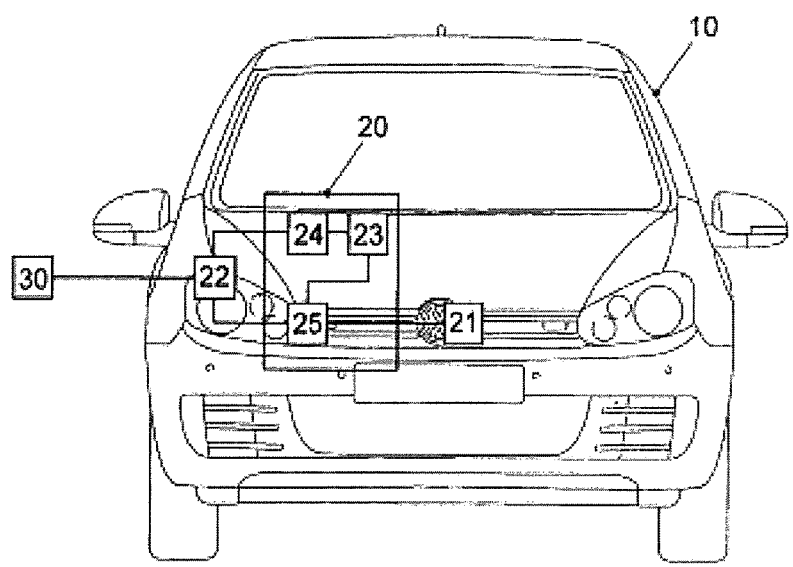
FIG. 3 shows a vehicle comprising a device according to at least one disclosed embodiment.

FIG. 3 shows an external charging device 30 together with a vehicle 10 which is connected to the device 30. The vehicle 10 comprises a device 20, a connection 22 for connection to the charging device 30, and a high-voltage energy store 21. The device 20 comprises, for its part, control means 23, a voltmeter 24 and a current regulator 25.

With the aid of the voltmeter 24, the device 20 measures a voltage which is applied across the connection 22. A charging current, which is generated by the charging device 30 and with which the energy store 21 is charged, is set with the aid of the current regulator 25 as a function of this measured voltage in such a way that the power loss, in particular of the charging device 30 during charging, is limited or set to an optimum value.

When a driver of an electric vehicle charges a high-voltage battery of his vehicle from a charging device which is foreign to him, the driver has to limit the charging current to prevent damage to the charging device, for example on account of an excessive development of heat during the charging process. If the driver cannot ascertain a charging current maximum, which defines the maximum charging current which is to be generated by the charging device, the driver has to charge the vehicle with as low a charging current as possible for safety reasons, as a result of which the charging process is disadvantageously prolonged.

Therefore, disclosed embodiments also carry out the charging process by means of an unknown foreign charging device in as short a time as possible.

Illustrative embodiments provide a method for charging an energy store of a vehicle, by a device for charging an energy store of a vehicle or by a vehicle.

A method for charging an energy store of a vehicle by means of a charging device is provided. In the process, a voltage, in particular an AC voltage, which is provided by the charging device across a connection of the vehicle is measured. A charging current, which is supplied by the charging device and with which the energy store is charged, is set as a function of the measured voltage in such a way that the power loss during charging is limited.

Since the power loss during charging is limited, the development of heat, for example, is also correspondingly limited in the charging device or in the vehicle on account of the power loss. If, for example, a threshold value for the power loss is accordingly set, and the charging current is set in such a way that the power loss during charging remains below this threshold value, the development of heat can be correspondingly limited, as a result of which damage to the charging device or to the vehicle is advantageously avoided by a suitable selection of the threshold value, and a correspondingly high charging current is nevertheless generated (as a function of the threshold value), to charge the energy store at the appropriate time.

In this case, a charging device is understood to be a device which provides a voltage to the vehicle. The device can also be a normal power outlet.

According to at least one disclosed embodiment, the voltage across the connection is measured as an open-circuit voltage in a no-load state of the charging device. The voltage which is currently applied across the connection and which is set as a function of the charging current is measured during charging of the energy store. A difference between the open-circuit voltage and the voltage which is currently measured across the connection is then determined and the charging current is regulated or set as a function of this difference.

The no-load state of the charging device occurs, in particular, when the charging current is equal to zero. The power loss, which is produced in the charging device and/or in the vehicle on account of the charging, depends on the product of the difference (voltage difference) and the charging current. Since this difference is kept correspondingly low by corresponding regulation or setting of the charging current, the power loss in the charging device is accordingly also kept correspondingly low.

Measurement of the open-circuit voltage, that is to say measurement of the voltage across the connection of the vehicle in the no-load state, can be repeated at predetermined time intervals to be able to take into account fluctuations in the voltage which is provided by the charging device.

Since measurement of the open-circuit voltage is repeated at time intervals, voltage fluctuations in the charging device during regulation of the charging current are advantageously taken into account in such a way that the power loss can be regulated to an optimum or can be kept at least below a threshold value in spite of the voltage fluctuations.

According to another disclosed embodiment, a ratio V of the difference dU between the open-circuit voltage UR and the voltage U which is currently measured across the connection to the open-circuit voltage UR is determined in accordance with the following equation (1).

$$V = \frac{dU}{U_R} = \frac{U_R - U}{U_R} \qquad (1)$$

In this case, the charging current is set in such a way that this ratio V is kept as far as possible in a range of 1% to 5%, optionally at 3%. In this case, the higher the charging current is set, the greater the difference between the open-circuit voltage and the voltage which is currently measured across the connection.

When the ratio V is kept at a certain percentage, this means that the voltage which is currently measured across the connection has dipped in relation to the open-circuit voltage by this percentage. According to VDE standard 0100, the percentage of 3%, for example, is also still defined as a permissible dip in voltage.

When the voltage which is measured across the connection falls below a predetermined voltage threshold value, the charging current is, in particular, regulated down to 0 or the charging process is interrupted.

This ensures that charging is terminated immediately when the AC voltage across the connection falls too severely during charging, as a result of which overheating of the device during charging is precluded. The predetermined voltage threshold value can be selected, for example, in such a way that it is in a range of from 90% to 95% of the open-circuit voltage. If the measured voltage falls below the voltage threshold value and the charging process is interrupted, it is possible, for example, for the driver to be informed of this.

According to a further disclosed embodiment, a charging current pulse is generated and, during the generation of this charging current pulse, a time profile of the voltage across the connection is detected. A line resistance, in particular, within the charging device can then be determined as a function of the profile of this voltage and as a function of properties of this charging current pulse (for example maximum value, time period). The charging current is then set as a function of this line resistance, which is ascertained in this way, in such a way that the power loss within the charging device is regulated to an optimum.

By way of example, a resistance R is calculated using the following equation (2)

$$R = \frac{dU}{I} \qquad (2)$$

In this case, I corresponds to the amplitude of the current pulse, and dU is the (maximum) voltage difference which occurs on account of the generated current pulse.

The calculated resistance R is then compared with a standard resistance value SR which can be calculated using the following equation (3).

$$SR = \frac{\rho \times l}{A} \quad (3)$$

In this case, ρ is the specific resistance (unit [ωmm²/m]), l is the line length, and A is the line cross section of a charging cable by means of which the energy store is charged.

The calculated resistance is compared with the standard resistance and the charging current is set as a function of this comparison. In particular, the charging current should be set in such a way that the calculated resistance multiplied by a predetermined factor (for example 1.01 to 1.4) is not greater than the standard resistance (for example when the amplitude of the charging current corresponds to the amplitude of the current pulse).

A further method for charging an energy store of a vehicle is also provided. According to this method, the power loss during charging of the energy store is determined and the charging current during charging of the energy store is set as a function of this power loss.

This method makes it possible to set the charging current in such a way that the power loss within the charging device is regulated to an optimum.

Regulating the power loss within the charging device to an optimum means that the power loss is set in such a way that a voltage dip in the voltage which is provided by the charging device across the connection of the vehicle corresponds as accurately as possible to a predetermined percentage (which is, for example, in a range of from 1% to 5%, optionally is 3%) (compare equation (1) above).

A device for charging an energy store of a vehicle by means of an external charging device is also provided. The device comprises control means, a voltmeter and a current regulator. A voltage which is provided by the charging device to a connection of the vehicle is measured with the aid of the voltmeter. A charging current, which is generated by the charging device and charges the energy store, is set as a function of the measured voltage by means of the control means and the current regulator in such a way that a power loss, in particular within the charging device, during charging is limited.

A further device for charging an energy store of a vehicle is also provided. This further apparatus comprises control means and a current regulator. A power loss, in particular of the charging device, is determined during charging of the energy store with the aid of the control means. A charging current during charging of the energy store is set as a function of this power loss with the aid of the control means and the current regulator.

According to DE 195 21 962 A1, a charging process of a battery for an electric vehicle is controlled by a charging process termination signal being generated when a voltage drop in the battery voltage below a prespecified voltage occurs.

U.S. 2008/0007202 A1 describes a charging system for a vehicle, in which charging system the beginning of the charging time and the charging time are determined.

U.S. 2004/0169489 A1 describes charging batteries. In this case, a no-load voltage is measured to determine a power level for charging. This power level is increased until a current or voltage limit is exceeded.

DE 10 2005 011 081 A1 describes a method to identify whether an external voltage is applied to a rechargeable battery, for which purpose the rechargeable battery voltage is disconnected from the output of the rechargeable battery at time intervals.

DE 35 28 476 A1 discloses charging a traction battery. To follow a charging characteristic curve, charging current and charging voltage are measured in the process.

The invention claimed is:

1. A method for charging an energy store of a vehicle by a charging device, the method comprising:
   measuring a charging voltage (U) provided by the charging device across a connection; and
   regulating a charging current (I) provided by the charging device and which charges the energy store as a function of the charging voltage (U) of the charging device in order to limit the power loss during charging,
   wherein the charging voltage (U) of the charging device across the connection is measured as an open-circuit voltage in the no-load state,
   wherein the charging current (I) is regulated as a function of a difference (dU) between the open-circuit voltage and the charger voltage (U) of the charging device which is currently measured across the connection, and
   wherein the charging current (I) is regulated to keep a ratio of the difference (dU) and the open-circuit voltage at a predetermined value.

2. The method of claim 1, wherein the charging voltage of the charging device, which is measured across the connection, is an AC voltage (U).

3. The method of claim 1, wherein measurement of the open-circuit voltage is repeated at predetermined time intervals to take into account fluctuations in the charging voltage (U) of the charging device which is provided by the charging device.

4. The method of claim 1, wherein the charging current (I) is adjusted to 0 when the charging voltage (U) of the charging device, which is measured across the connection, falls below a predetermined voltage threshold value.

5. The method of claim 1, the method further comprising:
   generating a current pulse of the charging current (I);
   detecting a profile of the charging voltage (U) of the charging device across the connection as the current pulse flows;
   determining a line resistance as a function of the profile of the charging voltage (U) of the charging device and as a function of the current pulse; and
   regulating the charging current (I) as a function of the line resistance.

6. A method for charging an energy store of a vehicle, the method comprising:
   determining a power loss during charging of the energy store; and
   establishing a charging current (I) during charging of the energy store as a function of the power loss,
   wherein a charging voltage (U) of a charging device across a connection with the energy store, is measured as an open-circuit voltage in the no-load state,
   wherein the charging current (I) is regulated as a function of a difference (dU) between the open-circuit voltage and the charging voltage (U) of the charging device which is currently measured across the connection, and
   wherein the charging current (I) is regulated to keep a ratio of the difference (dU) and the open-circuit voltage at a predetermined value.

7. A device for charging an energy store of a vehicle by a charging device; the device comprising:
   a controller;
   a voltmeter; and
   a current regulator, wherein the voltmeter measures a charging voltage (U) provided by the charging device across a connection of the vehicle, wherein the controller and the current regulator regulate a charging current which is provided by the charging device and charges the energy store as a function of the measured charging voltage (U) provided by the charging device to limit a power loss during charging, wherein the charging voltage (U) provided by the charging device across a connection, is measured as an open-circuit voltage in the no-load state, wherein a charging current (I) is regulated as a function of a difference (dU) between the open-circuit voltage and the charging voltage (U) provided by the charging device which is currently measured across the connection, and wherein the charging current (I) is regulated to keep a ratio of the difference (dU) and the open-circuit voltage at a predetermined value.

8. The device of claim 7, wherein the device carries out the method of claim 1.

9. A vehicle comprising a device as claimed in claim 7.

10. A device for charging an energy store of a vehicle, the device comprising:

a controller; and a current regulator, wherein the device determines a power loss during charging of the energy store by the controller, and establishes a charging current (I) during charging of the energy store as a function of the power loss using the controller and the current regulator, wherein a charging voltage (U) provided by the charging device across a connection, is measured as an open-circuit voltage in the no-load state, wherein the charging current (I) is regulated as a function of a difference (dU) between the open-circuit voltage and the charging voltage (U) of the charging device which is currently measured across the connection, and wherein the charging current (I) is regulated to keep a ratio of the difference (dU) and the open-circuit voltage at a predetermined value.

* * * * *